July 25, 1944.　　　　R. W. ALLEN.　　　　2,354,447

PRESS

Filed Jan. 1, 1943　　　3 Sheets-Sheet 2

Inventor
RAYMOND W. ALLEN
By Ely & Frye
Attorneys

July 25, 1944.  R. W. ALLEN  2,354,447
PRESS
Filed Jan. 1, 1943  3 Sheets-Sheet 3
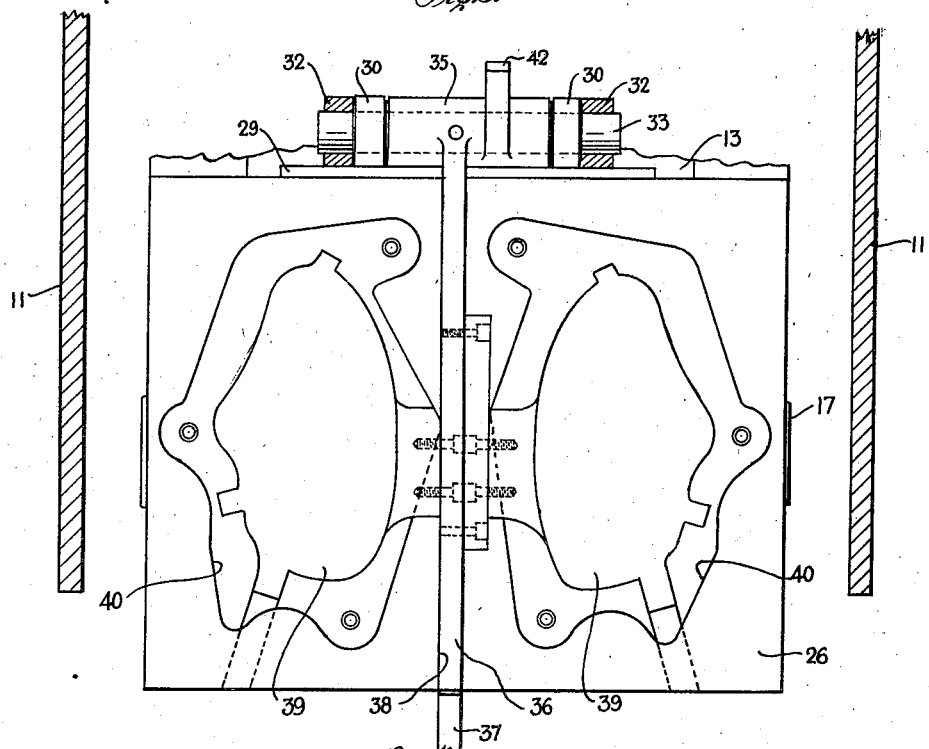
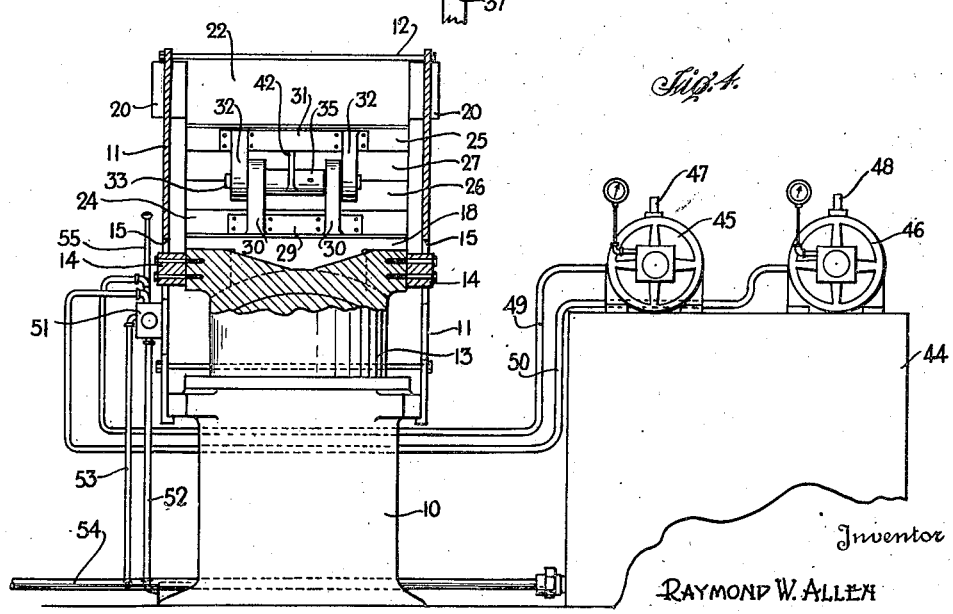
Inventor
RAYMOND W. ALLEN
By Ely & Frye
Attorneys Patented July 25, 1944

2,354,447

UNITED STATES PATENT OFFICE 2,354,447

PRESS

Raymond W. Allen, Akron, Ohio, assignor to The Firestone Tire & Rubber Company, Akron, Ohio, a corporation of Ohio Application January 1, 1943, Serial No. 471,221

4 Claims. (Cl. 18—17)

This invention relates to presses such as are employed for molding articles from plastic material, and more especially it relates to platen presses for molding articles upon forms or mandrels.

The invention is depicted herein, for illustrative purposes, in its application to a dual press, that is, a press employing two sets of platens arranged side by side and operated by a single prime mover, but it will be understood that the invention is equally applicable to single presses.

The chief objects of the invention are to provide in an improved manner for effecting the opening and closing of the platens of the press; to facilitate the mounting of work in the press; to facilitate the separation of the work from the molding surfaces of the press; and to provide in an improved manner for the mounting of mandrels about which the work is molded. Other objects will be manifest as the description proceeds.

Of the accompanying drawings:

Fig. 3 is a horizontal section through a portion of the press showing a lower mold section in plan and mandrels operatively associated therewith; and Fig. 4 is a front elevation of the press and the power apparatus for operating the same, a part being in section on the line 4—4 of Fig. 1.

Figure 1:
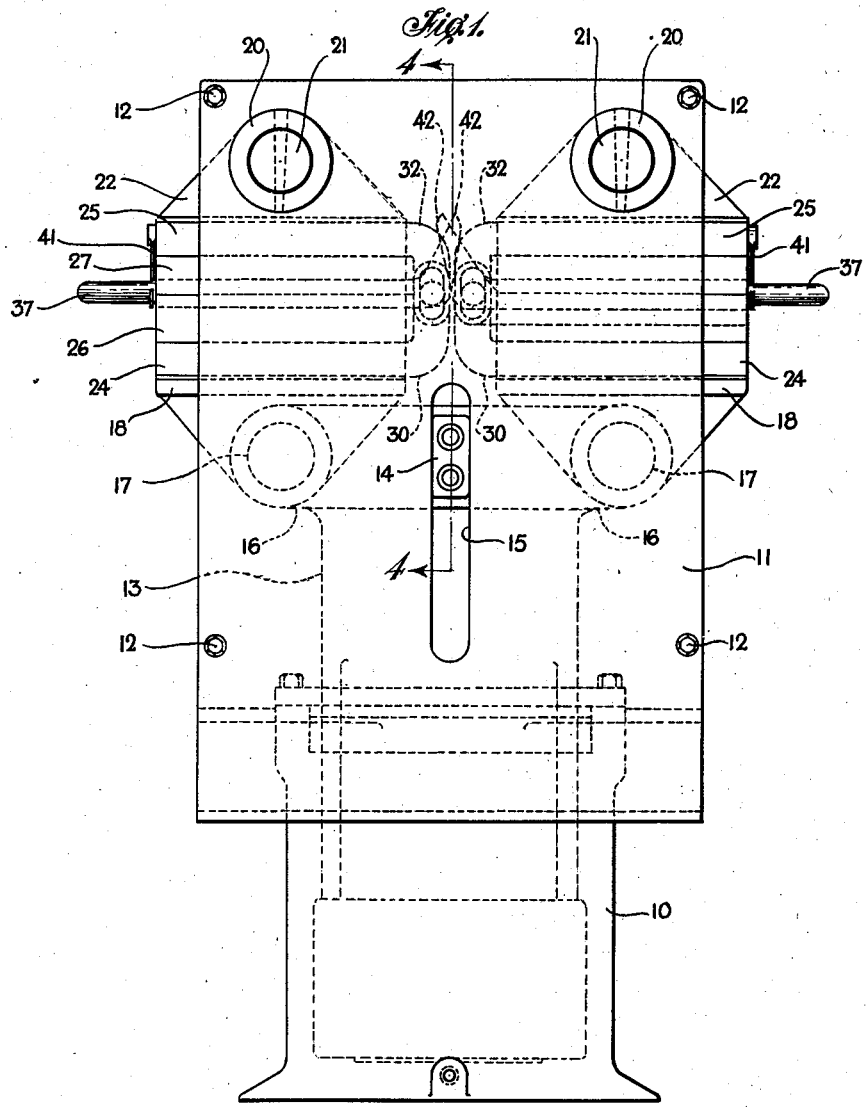
Fig. 1 is a side elevation of a dual press embodying the invention, in closed or operative condition.

Referring to the drawings, there is shown a press comprising a base or pedestal 10, and secured thereto and rising therefrom, on opposite sides thereof, are parallel strain plates 11, 11, the latter being connected to each other at a plurality of points by tie rods 12, 12. The base 10 is hollow, and constitutes a fluid pressure operated cylinder, and mounted therein and operated thereby is a vertically disposed ram 13. The upper end portion of the ram 13, which constitutes the head thereof, has slide blocks 14, 14 secured to opposite sides thereof, which slide blocks are received in respective vertical slots 15 in the strain plates 11, said blocks sliding in said slots during upward and downward movement of the ram and preventing the latter from turning angularly about its axis. Formed on the head of ram 13, at the front thereof and at the rear thereof, are pairs of apertured ears 16, 16 the respective ears of each pair being in axial alignment with each other and located on opposite sides of the ram. Each pair of ears 16 carries a horizontal shaft or pivot bar 17 that is journaled therein, which shafts are parallel to each other and in the same horizontal plane. Fixedly mounted upon the shafts 17 are respective platens 18, which platens are of identical construction and constitute the lower platens of the two units of the press.

The strain plates 11 are formed near their upper margins with apertured bearing bosses 20, 20, and non-rotatably supported in said bosses are horizontal shafts or pivot bars 21, 21. The latter are parallel to each other in the same horizontal plane, and are parallel to and in the same vertical planes as the respective shafts 17. Each shaft 21 has pivotally suspended therefrom a platen 22, which platens are identical and constitute the upper platens of the dual press units. In all other respects the dual press units are of identical construction so that a detailed description of one of them will suffice for both.

The particular press herein illustrated is intended for the molding of articles of heat-hardened plastic, specifically rubber composition, and for the vulcanization of the rubber composition while it is in the press. For providing heat to vulcanize such articles, a steam-heated platen 24 is mounted upon the upwardly presented face of the lower platen 18, and a similar steam-heated platen 25 is mounted upon the downwardly presented face of the upper platen 22. Flexible conduits (not shown) conduct steam from a convenient source of supply thereof (not shown) to said platens, and drain condensate therefrom, as is well understood by those skilled in this art. For molding articles in the press unit, a mold comprising a pair of mating mold sections is provided, the lower mold section, designated 26, being secured to the upwardly presented face of steam platen 24, and the upper mold section, designated 27, being secured to the downwardly presented face of steam platen 25.

Figure 2:
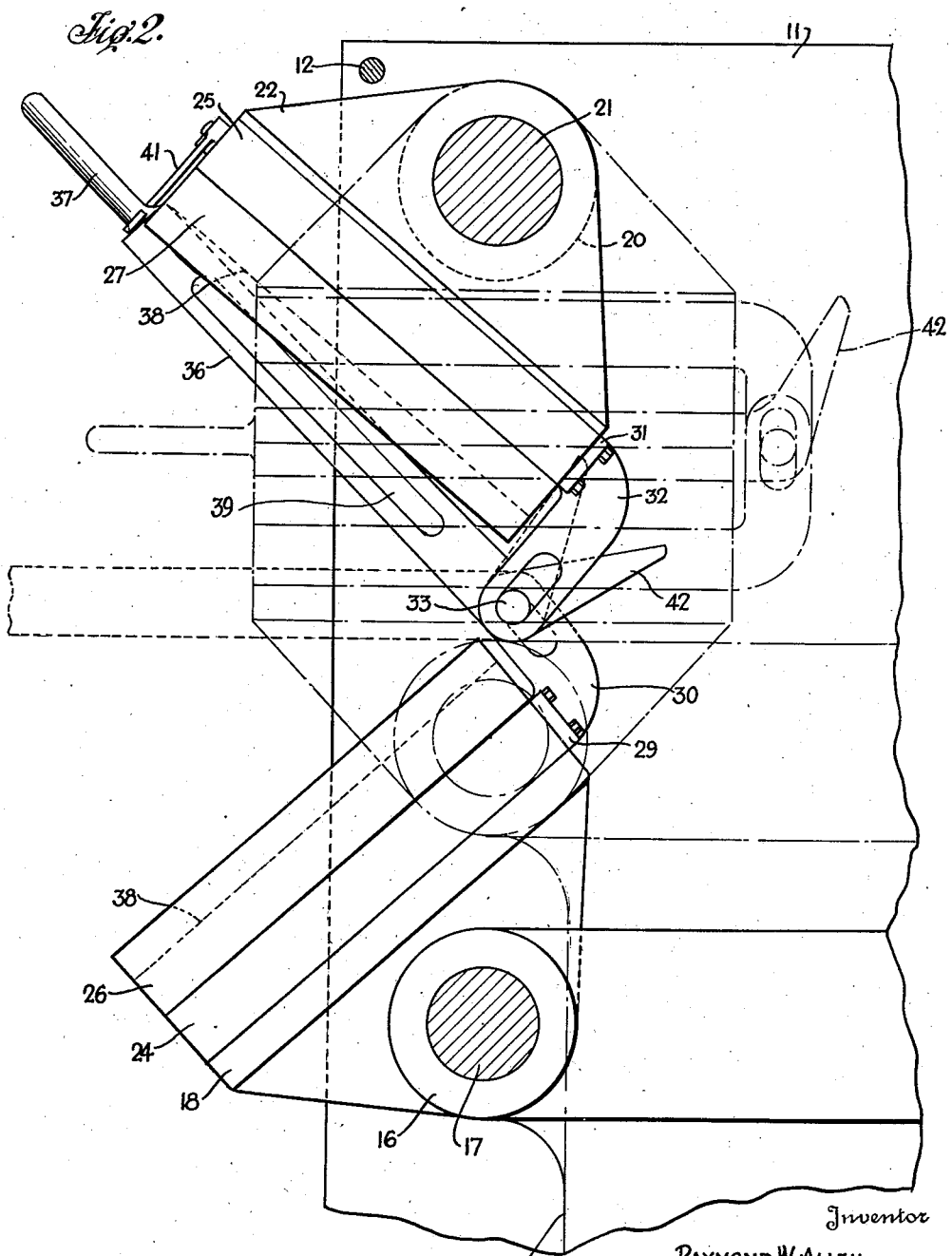
Fig. 2 is a fragmentary side elevation, on a larger scale, showing two platens of the press in open or inoperative condition.

The apparatus is so arranged that the mold sections 26, 27 are in mating, operative position, as shown in broken lines in Fig. 2, when the ram 13 is in elevated position, and in open, oblique position, as shown in full lines in Fig. 2, when the ram is in lowered position. To effect such angular movement of the mold sections as the result of movement of the ram, the steam platens 24, 25 are hingedly connected to each other with a lost motion connection. The latter comprises a bracket 29 that is attached to the rear marginal face of steam-platen 24 and formed with a pair of apertured arms 30 that extend upwardly toward steam-platen 25. A somewhat similar bracket 31 is attached to the rear marginal face of the upper steam-platen 25 and is formed with a pair of spaced apertured arms 32 that extend downwardly toward lower steam platen 24. Each bracket arm 30 is positioned beside a bracket arm 32, and the pairs of bracket arms 30, 32 are substantially spaced apart from each other and receive the respective end portions of a hinge pin 33 that extends through the apertures in said arms. Said apertures are elongated, as best shown in Fig. 2, so as to constitute slots, the arrangement providing a lost-motion connection between the brackets 29, 31, and through the agency of the latter, between lower and upper platens 18, 22, the hinge pin being movable bodily relatively of both pairs of bracket arms in the opening and/or closing of the press.

Mounted upon the hinge pin 33, between the pairs of bracket arms aforesaid, is a hub 35 that is formed with a radial arm 36 that extends between the mold sections 26 and 27 and projects beyond the front marginal faces of the latter, the projecting portion of the arm being formed as a hand grip 37. The hub 35 is pinned to the hinge pin 33 and thus prevents axial movement of the latter. The mold sections 26, 27 are formed with opposed recesses 38 in their confronting faces, which recesses extend from front to rear thereof and receive the arm 36 in the closed condition of the press. The function of the arm 36 is to support a pair of mandrels 39, 39, Fig. 3, utilized for the molding of articles in the press. Said mandrels project laterally from opposite sides of the arm and are received within respective molding cavities formed in the confronting faces of the mold sections 26, 27, the molding cavities in the lower mold section 26 being shown at 40, 40, Fig. 3. Pivotally mounted upon the front marginal face of steam-platen 25 is a hook or latch 41 that is adapted to engage with the hand grip portion 37 of arm 36, and thus to retain the said arm in engagement with the upper mold section 27, as shown in Fig. 2, for a purpose presently to be explained. The hub 35 also is formed with a relatively short, radially projecting finger 42 that is disposed at an angle to the arm 36, and projects upwardly and rearwardly when the said arm is in horizontal position. The arrangement is such that when the mold sections are in open position and the latch 41 is disengaged from the arm 36, the finger 42 will engage the rear marginal faces of steam-platen 25 and upper mold section 27 and thus, by limiting angular movement of the hub 35 upon its axis, support the arm 36 and mandrels carried thereby substantially in horizontal position as shown in broken lines in Fig. 2.

The press is opened and closed by means of hydraulic pressure, and optimum efficiency is achieved by utilizing low fluid pressure for elevating the ram to close the molds of the respective press units, and thereafter utilizing high fluid pressure for retaining the molds in closed position upon the work. To this end there is provided a reservoir 44, Fig. 4, for oil, the latter being the fluid used for operating the press. Mounted atop of said reservoir are electric motors, 45, 46, motor 45 being coupled to a low pressure pump 47 and motor 46 being coupled to a high pressure pump 48, said pumps being partly visible in Fig. 4, beyond said motors. Said pumps have inlet connections (not shown) whereby they withdraw fluid at atmospheric pressure from the reservoir 44, the pump 47 discharging through a low pressure pipe 49 and the pump 48 discharging through a high pressure pipe 50, said pipes 49, 50 extending to a four-way valve 51 mounted upon one of the strain plates 11 of the press. An inlet-and-outlet pipe 52 extends from the valve 51 to the single port of the fluid pressure cylinder in press base 10 whereby either high pressure fluid or low pressure fluid may be delivered thereto for action on the ram 13, or drained therefrom during the lowering of the ram to open the press. The valve 51 also is provided with a return pipe 53 that connects with a discharge pipe 54 extending to the reservoir 44, said pipe 54 also having connection (not shown) with a source of supply of oil. The arrangement is such that the pipe 54 may be used for filling or draining the reservoir, and for returning fluid thereto after said fluid has served its purpose in the fluid pressure cylinder of the press. The valve 51 has a hand operated control lever 55 by means of which the valve is operated to produce the result desired.

In the operation of the apparatus, let it be assumed that the ram 13 is lowered and that the mold sections 26, 27 are angularly spread apart as shown in Fig. 2, the arm 36 with mandrels thereon being detached from the latch 41, in the position shown in broken lines in said figure. Work pieces consisting of unvulcanized sheet rubber composition are then mounted in the mold cavities 40 of the lower mold sections 26, and also are mounted upon the top surface of the mandrels 39. Thereafter the valve 51 is operated to effect closing of the press, first by admitting low pressure fluid to the press cylinder to elevate the ram, and then by using high pressure fluid in the cylinder to exert heavy pressure upon the closed molds and the work therein. In this condition of the press, heat from the steam-platens 24, 25 effects vulcanization of the work in the molds. While the press is in closed position the latch 41 is engaged with the arm 36.

After vulcanization, the pressure fluid is evacuated from the press cylinder to lower the ram 13 and thus to open the molds by tilting the upper and lower platens of the press to the angular positions shown in full lines in Fig. 2, such tilting being the result of the inter-connection of the steam-platens through the agency of the brackets 29, 31 and the hinge pin 33. Because of the lost motion in said inter-connecting means, the mold sections remain in parallelism during the initial phase of their opening movement, and because the arm 36 is engaged at its forward end by the latch 41, the mandrels 39 will remain in association with the upper mold section 27, with the result that the work is stripped from the lower mold section 26. Furthermore, as the mold sections separate, the pivot pin 33 moves relatively of the bracket arms 30, 32 until it is in the ends of the slots therein, as shown in full lines in Fig. 2 with the result that the rear end portion of the arm 36 is moved out of engagement with the upper mold section 27, whereby the work, on the mandrels 39, is stripped from said upper mold section. The arm 36 may then be disengaged from the latch 41 and lowered to the horizontal position shown in dotted lines in Fig. 2, in which position the molded and vulcanized work pieces are readily stripped from the mandrels 39 carried by said arm. This completes a cycle of operation.

The invention saves time and labor in the manufacture of molded rubber articles, and achieves the other advantages set out in the foregoing statement of objects.

Modification may be resorted to without departing from the spirit of the invention or the scope thereof as defined by the appended claims.

I claim:

1. In a press of the character described, the combination of a pair of molding units disposed back to back, each of said units comprising opposed upper and lower platens that are hinged together so as to open and close by swinging movement when the lower platens are moved from and toward the respective upper platens, parallel pivot pins having a fixed situs constituting supports for the respective upper platens, and a hydraulic ram pivotally connected to both said lower platens and constituting the sole support thereof for concurrently raising and lowering the same.

2. In a press of the character described, the combination of a pair of platens carrying respective mating mold sections defining a molding cavity, respective pivotal supports for said platens of which the upper support has a fixed situs, means for raising and lowering the lower support to move said platens toward and from each other, a lost motion hinge connecting the platens to each other at the rear margins thereof, said hinge comprising a hinge pin that moves bodily relatively of both platens during opening and/or closing of the press, a mandrel for the molding cavity in said mold sections, and an arm to which said mandrel is attached, said arm extending forwardly between said platens from an integral hub portion that is pivotally mounted on said hinge pin.

3. A combination as defined in claim 2 including a latch for releasably engaging the mandrel-arm at the end thereof remote from the hinge pin to retain said arm in association with the upper mold section as the press is opened.

4. A combination as defined in claim 2 including a finger formed on the arm-hub and projecting upwardly and rearwardly therefrom, obliquely of said arm, said finger adapted to engage the rear marginal portion of the upper platen, when the press is in open position, to support the arm and mandrel thereon substantially in horizontal position and in spaced relation to the mold sections.

RAYMOND W. ALLEN.